Patented Nov. 20, 1923.

1,475,155

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARTIFICIAL CRYOLITE.

No Drawing.    Application filed February 23, 1922.   Serial No. 538,646.

*To all whom it may concern:*

Be it known that I, HENRY HOWARD, a citizen of the United States, residing at Cleveland, in the county of Cuyahoga and State of Ohio, have invented certain new and useful Improvements in Processes of Making Artificial Cryolite, of which the following is a specification.

This invention relates to a process for the commercial production of artificial cryolite, $Al_2F_6 \cdot 6NaF$.

Artificial cryolite contains less impurities than natural cryolite and is therefore preferred for many purposes, for instance, for the manufacture of enamels. The inexpensive commercial production of artificial cryolite is therefore desirable and is an object of my invention.

I have found that artificial cryolite, the composition of which corresponds substantially with the formula $Al_2F_6 \cdot 6NaF$, may be prepared by the interaction of aluminum hydrate, sodium chlorid, and hydrofluoric acid provided that the reaction is carried out in such a manner that the reaction mixture is at no time, and particularly near the end of the reaction, allowed to become strongly acid with hydrochloric acid.

The chemical reactions involved in the process are simple and may be carried out in various ways. The principal point of the invention therefore is to avoid the presence of hydrochloric acid in the reaction mixture. If hydrochloric acid, formed by the interaction of hydrofluoric acid and sodium chlorid is permitted to form and accumulate in the reaction mixture in substantial concentration the composition of the artificial cryolite product will differ materially from the composition indicated by the chemical formula for cryolite.

For instance if aluminum hydrate, hydrofluoric acid and sodium chlorid are caused to react in accordance with the equation $$Al_2O_3 \cdot 3H_2O + 12HF + 6NaCl = Al_2F_6 \cdot 6NaF + 6HCl + 6H_2O$$

the product will contain a considerably greater proportion of aluminum than is indicated by the formula $Al_2F_6 \cdot 6NaF$.

One method of carrying out the process is as follows:

I first prepare neutral solutions of aluminum fluorid and ammonium fluorid by dissolving aluminum hydrate and ammonia in separate batches of hydrofluoric acid solution. Or if desired a neutral solution of aluminum fluorid and ammonium fluorid may be prepared by dissolving one molecular equivalent of aluminum hydrate $$(Al_2O_3 \cdot 3H_2O)$$

and six molecular equivalents of ammonia ($NH_3$) in twelve molecular equivalents of hydrofluoric acid (HF). The separate neutral solutions of aluminum fluorid and ammonium fluorid or the neutral solution containing both salts prepared as described above, are then mixed with a solution of sodium chlorid in the proportions represented by the equation, $$Al_2F_6 + 6NH_4F + 6NaCl = Al_2F_6 \cdot 6NaF + 6NH_4Cl$$

whereby artificial cryolite and ammonium chlorid are formed. The artificial cryolite separates as a precipitate and may be recovered from the reaction mixture by filtration, decantation or in any other suitable manner and after washing and drying is ready for use. The separated liquid or filtrate and wash liquors contain ammonium chlorid which constitutes a valuable by-product of the process.

By the procedure described above sodium chlorid is employed as the source of the sodium constituent of the cryolite but the formation of hydrochloric acid in the reaction mixture is avoided.

Another method of carrying out my process is as follows:

In one vessel I prepare a solution of aluminum fluorid in hydrofluoric acid by dissolving one molecular equivalent of $Al_2O_3 \cdot 3H_2O$ in twelve molecular equivalents of HF. In a separate vessel I prepare a solution of sodium chlorid in water containing six molecular equivalents of NaCl. The aluminum fluorid solution containing an excess of hydrofluoric acid sufficient to convert the sodium chlorid to sodium fluorid is then slowly added to the sodium chlorid solution with constant stirring simultaneously with the addition of ammonia to the mixture, the rate of addition of ammonia being regulated to maintain the reaction mixture slightly acid until all of the aluminum fluorid solution has been added, whereupon enough ammonia is added to neutralize the reaction mixture. After the reaction is complete and the reaction mixture has been neutralized, the artificial cryolite is separated, washed and dried and the mother liquors and wash waters are treated for the recovery of ammonium chlorid. The composition of the artificial cryolite product corresponds substantially with the formula $Al_2F_6.6NaF$.

As a source of ammonia I preferably employ crude ammonia liquors. The purpose of maintaining the reaction mixture slightly acid during the process is to avoid loss of ammonia.

The advantages of my process are the production of true artificial cryolite, that is, artificial cryolite the composition of which corresponds with the formula $Al_2F_6.6NaF$ by simple operations and by the use of inexpensive materials, particularly sodium chlorid. A further advantage of the process resides in the fact that the chlorine component of the sodium chlorid is utilized in the production of a valuable by-product, ammonia chlorid.

I claim:

1. Process of making artificial cryolite which comprises reacting upon sodium chlorid with a solution of aluminum fluorid in hydrofluoric acid, and neutralizing the hydrochloric acid generated in the reaction.

2. Process of making artificial cryolite which comprises reacting upon aluminum hydrate and sodium chlorid with hydrofluoric acid and neutralizing the hydrochloric acid generated in the reaction.

3. Process of making artificial cryolite which comprises dissolving one molecular equivalent of aluminum hydrate ($Al_2O_3.3H_2O$) in twelve molecular equivalents of hydrofluoric acid and slowly adding the resulting solution to a solution of six molecular equivalents of sodium chlorid simultaneously with the introduction of ammonia into said sodium chlorid solution at a rate sufficient to maintain the reaction mixture only slightly acid.

4. Process of making artificial cryolite which comprises reacting upon aluminum hydrate and sodium chlorid with hydrofluoric acid, neutralizing hydrochloric acid as it is generated by means of ammonia, and separating and recovering the resulting artificial cryolite and ammonium chlorid.

5. Process of making artificial cryolite which comprises, reacting upon sodium chlorid with hydrofluoric acid in the presence of aluminum fluorid, and neutralizing the hydrochloric acid generated in the reaction.

6. Process of making artificial cryolite which comprises, adding hydrofluoric acid to a solution of sodium chlorid in the presence of aluminum fluorid, and maintaining the reaction mixture substantially neutral during the addition of the hydrofluoric acid by the simultaneous addition of a neutralizing agent.

7. Process of making artificial cryolite which comprises, simultaneously adding a solution containing aluminum fluorid and hydrofluoric acid and a solution of ammonia to a solution of sodium chlorid.

8. Process of making artificial cryolite which comprises combining ammonium fluorid, aluminum fluorid and sodium chlorid in a substantially neutral reaction mixture.

In testimony whereof, I affix my signature.

HENRY HOWARD.